June 18, 1968  J. H. GRADIN ET AL  3,389,276
PIEZOELECTRIC INSTRUMENT TRANSDUCERS
Filed May 25, 1965  3 Sheets-Sheet 1

INVENTORS.
JAMES H. GRADIN
BILLY R. TOLLIVER
SHMUEL ELAZAR
Christie, Parker & Hale
ATTORNEYS.

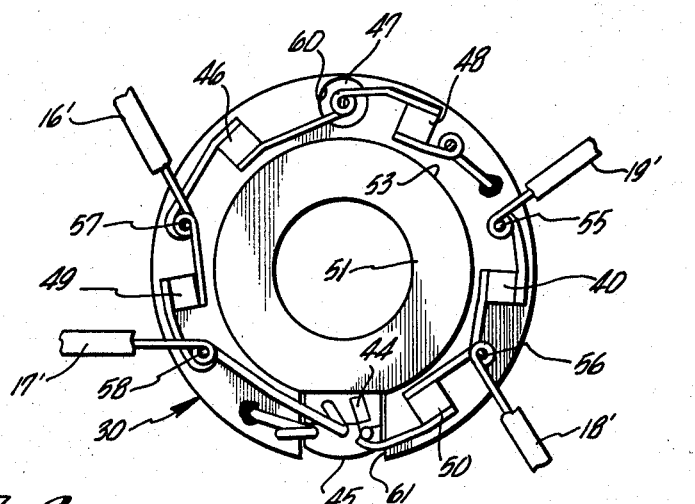
FIG_2_
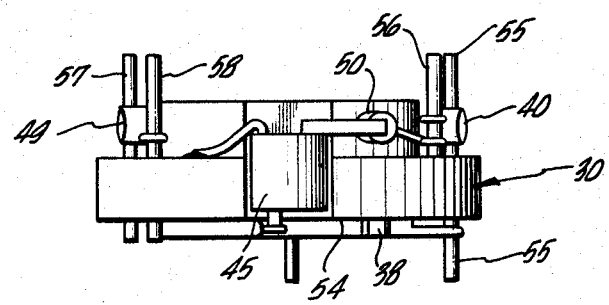
FIG_3_
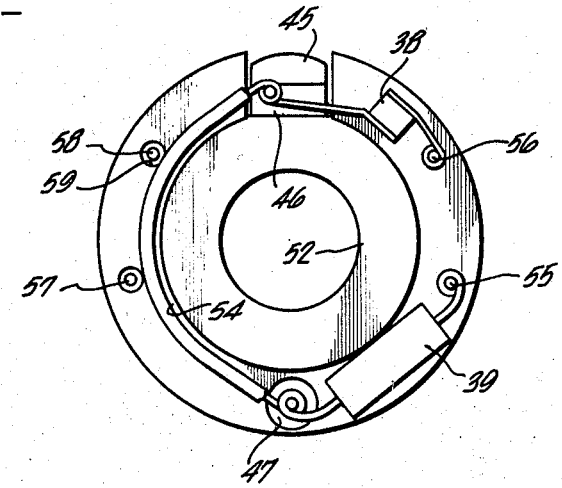
FIG_4_

United States Patent Office 3,389,276
Patented June 18, 1968

3,389,276
PIEZOELECTRIC INSTRUMENT TRANSDUCERS
James H. Gradin, Whittier, Billy R. Tolliver, Glendora, and Shmuel Elazar, El Monte, Calif., assignors to Consolidated Electrodynamics Corporation, Pasadena, Calif., a corporation of California
Filed May 25, 1965, Ser. No. 458,579
1 Claim. (Cl. 310—8.4)

ABSTRACT OF THE DISCLOSURE

A transducer including a piezoelectric device and a mass coupled to the device within a transducer housing, and in which active electronic circuit means, such as an impedance converting amplifier, are mounted to the mass and are coupled between the device and transducer output and circuit energization terminal means for conditioning a signal generated by the device prior to presentation of the signal to the output terminal means.

This invention relates to instrument transducers and, more particularly, to accelerometers in which solid state electronic circuits and circuit components are mounted to a seismic mass for conditioning a signal generated by a device to which the mass is coupled. The device is deformed as the mass moves in response to accelerations applied to the accelerometer. Preferably the signal generating device is a piezoelectric crystal.

Piezoelectric crystals are crystalline bodies of semimetallic or semi-conductive materials which have the property that they generate electric charges when deformed in specified ways. Such crystals are used in accelerometers to produce electrical signals which vary in value in proportion to the magnitude or "G-level" of accelerations applied to the accelerometers. The crystals are engaged between a mass and a support in a transducer housing. Accelerations applied to the housing cause the mass to move against the crystal, thereby deforming the crystal and causing the crystal to generate signals indicative of the magnitude of the applied accelerations.

The signal generated by the crystal is most conveniently viewed as an electric charge, although it can also be viewed as a voltage since the crystal has a characteristic capacitance. The signal is presented at accelerometer output terminals to which are connected suitable telemetering and/or recording devices. The charge generated by the crystal per unit deformation of the crystal is small. It thus has been necessary in the past to use low capacitance, low noise conductors to connect the accelerometer to the telemetering and/or recording devices. This has been done to avoid distortion and degradation of the signal passed from the transduced to the telemetering and/or recording devices. Even though low capacitance, low noise conductors are used, they do not completely prevent the presence of noise (spurious electrical signals) in combination with the signal generated in the transducer. The noise is produced by electrical fields in the areas through which the signal transmission conductor passes.

Moreover, piezoelectric crystals have a high impedance whereas the devices to which the transducer signal is applied usually have low input impedances. Piezoelectric transducers therefore are used in combination with impedance matching amplifiers. In the past, these amplifiers have been disposed exteriorly of the transducer, but as close to the transducer as possible to reduce the length of the low noise conductor through which the transducer output signal is applied to the amplifier. The amplifier includes circuits for conditioning the transducer output signal in predetermined ways. For example, the amplifier may contain circuits for limiting the amplitude of the signal applied to the telemetering or recording devices, or it may include a circuit for attenuating the generated signal when it has a frequency above a selected frequency.

This invention provides an improved piezoelectric accelerometer wherein the signal amplifying and conditioning electronics are mounted to the seismic mass. Such a transducer is compact and weighs no more than a more conventional device of equal sensitivity. The output signal from such a transducer can be supplied to a recording device via a shielded cable. The signal applied to the recording device is considerably freer of noise than the signal applied thereto from an amplifier located externally of the transducer. The signal conditioning electronics include means for matching the crystal or signal generator impedance to the input impedance of the recording device. The improved transducer provides a simplified instrumentation system since external signal conditioning and impedance matching electronics are no longer required.

Generally speaking, this invention provides an instrument transducer which includes a housing, a device in the housing for producing an electrical signal when deformed from a normal condition thereof, and means for mounting the device in the housing. The transducer also includes means movable in response to an input to the transducer for deforming the device from its normal condition so that the device generates an electrical signal having a value indicative of the value of the input. The movable means includes a mass coupled to the device. The transducer also includes output terminal means and electronic means secured to the mass in the housing. The electronic means is coupled between the output terminal means and the device for operating upon the signal generated by the device in a predetermined manner, and for applying the signal to the output terminal means.

The signal generating device is a piezoelectric crystal. The electronic means preferably includes an amplifier for matching the high impedance of the piezoelectric crystal to the usually considerably lower impedance of a mechanism to which the transducer is connected.

The above mentioned and other features of the present invention are more fully set forth in the following detailed description of a presently preferred embodiment of the invention taken in conjunction with the accompanying drawings wherein:

FIG. 2 is a top plan view of the seismic mass of the accelerometer shown in FIG. 1;

FIG. 3 is a side elevation view of the mass;

FIG. 4 is a bottom plan view of the mass; and

Figure 1:
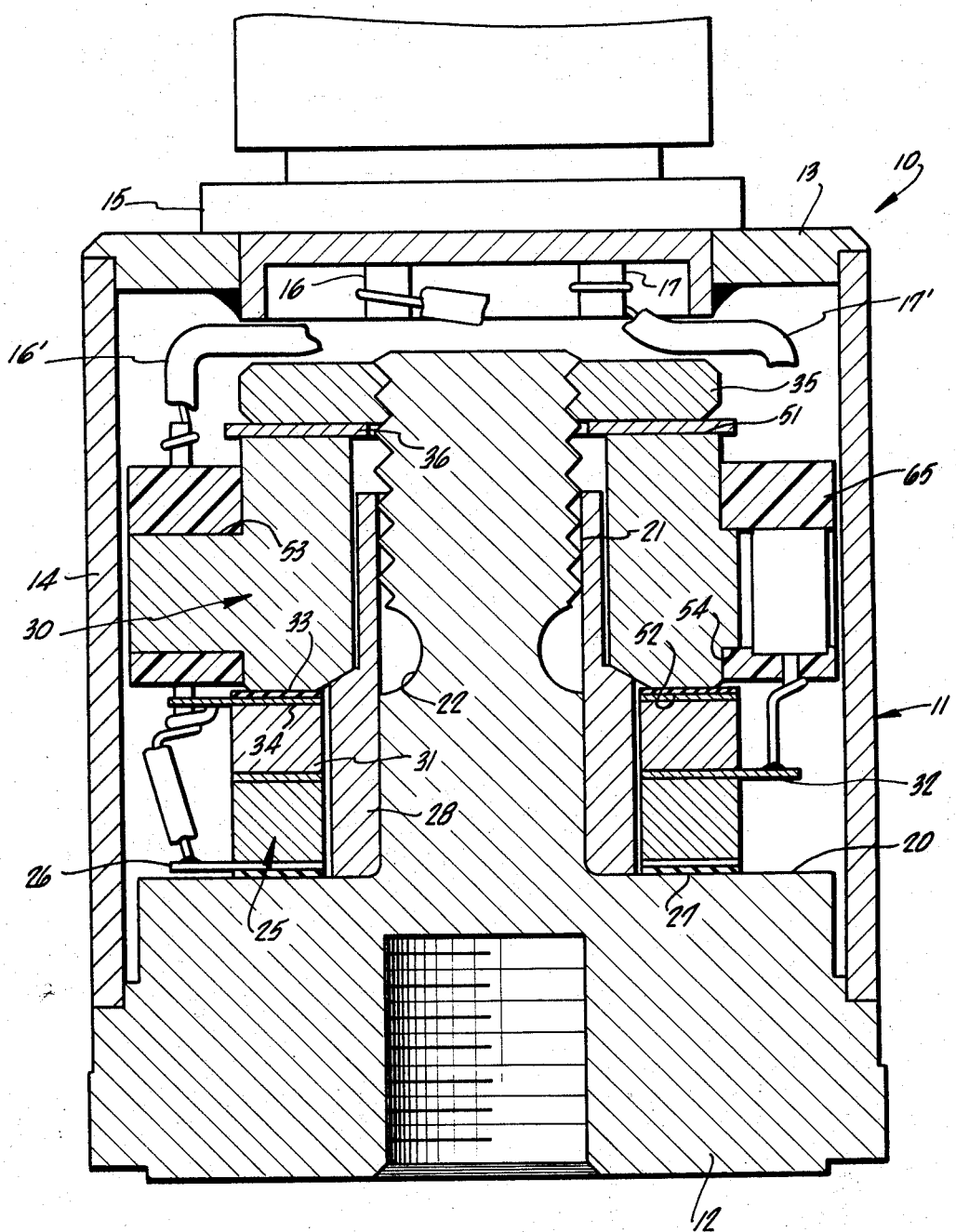
FIG. 1 is an enlarged cross-sectional elevation view of a piezoelectric accelerometer according to this invention.

FIG. 1 shows an accelerometer 10 having a housing 11 comprised of a base 12, a cap 13, and a cylindrical sleeve 14 interconnecting the base and the cap. The cap mounts a component 15 of an electrical connector assembly. The connector component defines four conductive terminals 16–19 (see FIG. 5). The base defines a substantially planar crystal support surface 20 inside the housing. An elongated cylindrical pedestal 21 extends perpendicularly from the surface toward the cap centrally of the transducer. The pedestal has a reduced diameter portion 22 intermediate its length.

An annular piezoelectric crystal 25 is disposed circumferentially of the pedestal and is engaged with the crystal support surface via a conductive electrode and spacer disc 26 and an insulator disc 27. The insulator disc is disposed between the electrode disc and surface 20. The crystal is separated from the pedestal by a sleeve 28 of electrically nonconductive material. An annular seismic mass 30 is disposed above crystal 25 circumferentially of the pedestal. The mass is spaced from the pedestal by sleeve 28. An essentially rigid annular capacitor 31, provided for compensating the variation in the output of crystal 25 with temperature, is disposed between the mass and the crystal. The temperature compensating capacitor is separated from the crystal by a conductive crystal and capacitor electrode disc 32. An insulator disc 33 and a conductive capacitor electrode disc 34 are disposed between the mass and the capacitor.

A nut 35 is threadably engaged with the upper end of pedestal 21. The nut and the upper end of the mass are interconnected by a washer 36. The nut is tightened down on pedestal 21 to bias mass 30 toward base 12 so that a predetermined load is imposed upon the crystal. The predetermined load determines the normal condition of the crystal. Pedestal 21 and nut 35 form a compliant mechanism for biasing the mass into operative engagement with the crystal. As accelerations are applied to housing 11 along a line axially of pedestal 21, mass 30 is caused to move toward and away from crystal 25, thereby increasing and decreasing the loading upon the crystal. As the loading on the crystal is varied, the crystal is deformed from its normal condition. Since the crystal is fabricated of a piezoelectric material, such deformations cause the crystal to generate electric charges. A given charge is manifested as a voltage between electrode discs 26 and 32 because of the intrinsic piezoelectric effect of the crystal and the forces developed on the crystal by the inertial mass.

It will be understood that the above described structure for mounting crystal 25 and mass 30 relative to base 12 is merely one form of compliant mechanism which may be used. Accordingly, except as specifically delineated in the appended claims, this invention is not restricted to the structure described above.

Figure 5:
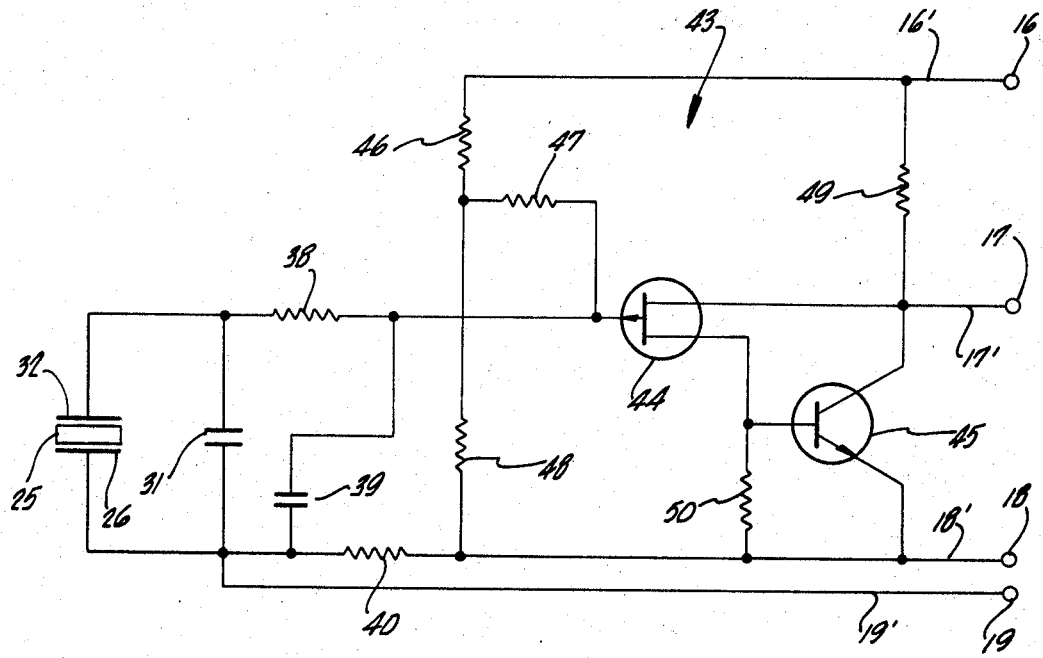
FIG. 5 is an electrical schematic diagram of the circuitry disposed within the accelerometer shown in FIG. 1.

FIG. 5 is a schematic diagram of the circuitry present in transducer 10. Temperature compensating capacitor 31 is coupled in parallel across crystal 25, and is such that its capacitance varies with temperature substantially in inverse proportion to the variation with temperature of the capacitance of the crystal. A low pass filter for attenuating the output of crystal 25 at and above the tuned frequency of the filter is coupled in parallel with the crystal. The filter is comprised of a resistance 38 and a capacitance 39. The common connection between crystal electrode 26 and capacitances 31 and 39 is connected to connector terminal 19 (a test terminal) via conductor 19', and to terminal 18 (a common terminal) via series connected resistance 40 and conductor 18'. Resistance 40 is provided so that a signal can be applied from an oscillator or the like across terminals 18 and 19 to test the condition of the electronics within transducer 10.

An impedance matching amplifier 43 is provided internally of the transducer for matching the high impedance of crystal 25 to the low impedance of a telemetering or recording device coupled to terminals 17 and 18. Amplifier 43 includes a field effect transistor 44 and a junction transistor 45. Resistances 46, 47, and 48 are provided for biasing the gate of the field effect transistor. Resistances 46 and 47 are connected in series between terminal 16, the energization terminal for the transducer, and the gate of the field effect transistor. Resistances 47 and 48 are connected in series between the gate of the field effect transistor and common terminal 18. The gate of the field effect transistor is also coupled to the output of the high frequency attenuating filter. A source biasing resistance 49 is coupled interiorly of the transducer between terminals 16 and 17; the source electrode of the field effect transistor is also coupled to output terminal 17. The drain of the field effect transistor is connected to the base of the junction transistor. A biasing resistance 50 is connected between common terminal 18 and the drain and the base of transistors 44 and 45, respectively. The internal circuitry of the transducer is completed by connecting the collector of the junction transistor to output terminal 17 and by connecting the emitter of this transistor to common terminal 18.

The components of amplifier 43 are selected so that substantially no current flows between the source and the gate of field effect transistor 44 via resistances 46, 47, and 49. The benefits of such an amplifier are more fully set forth in the above-identified copending application. Of particular significance to the present invention, however, is the feature that amplifier 43 requires no large "boot-strap" capacitor to maintain the field effect transistor gate and source connections at the same potential. This means that the amplifier is especially suited for use with this invention. Those skilled in the art, however, will appreciate that other amplifier circuits may be provided in the transducer in the manner taught by this invention, and the invention is not, therefore, restricted to the amplifier circuit described above. Preferably, the electrical circuit components of the amplifier used are miniature and microminiature elements; the components of the circuit described above are such elements.

Seismic mass 30 preferably is fabricated from a heavy metallic and electrically conductive material. The mass has upper and lower surfaces 51 and 52 which are engaged respectively with washer 51 and insulator disc 33, and are recessed at 53 and 54, respectively, around the outer circumference of the mass. The mass carries four terminals 55, 56, 57, and 58. The mass-mounted terminals preferably are fabricated from nickel alloy wires to facilitate welding of the circuit components thereto and are disposed in corresponding apertures (see aperture 59 associated with terminal 58 in FIG. 4) formed through the mass between the recesses. The terminal wires are insulated from the mass by suitable dielectric material. Terminals 55 and 56 extend into recess 54. Terminals 55, 57, and 58 extend into recess 51. A hole 60 is bored through the mass between the recesses and resistance 47 is mounted therein. A notch 61 is formed between the recesses in the circumference of the mass opposite hole 60. Transistors 44 and 45 are disposed in the notch. Capacitance 39, resistances 38, 40, 46, 48, 49, and 50 are disposed in the recesses as shown in FIGS. 2, 3, and 4. These elements are all connected to common terminals 55–58 as shown in FIGS. 2, 3, and 4 so that they are arranged in the manner indicated in FIG. 5. Resistances 40, 48, and 50 and the emitter of junction transistor 45 are also connected to the mass. Conductors 16', 17', and 19' are between terminals 57, 58, and 55, respectively, and the corresponding terminals provided in connector component 15. Conductor 18' is connected at one end to the mass and at its other end to the corresponding connector component terminal. The circuit components secured to the mass are encapsulated in potting material 65 as shown in FIG. 1 so that the components will not become dislodged from the mass as the transducer experiences vibrations during its operation.

The circuits and components shown in FIGS. 2–5 and the physical arrangement thereof are merely exemplary of many circuits which may be used in combination with a piezoelectric crystal in an accelerometer. The structure has been described above to illustrate how miniature and microminiature electronic components are secured to the seismic mass of an accelerometer in accord with this invention.

The structure described above provides an extremely compact accelerometer. The accelerometer is rugged since the signal conditioning and amplifying electronics are essentially integral with the mass by reason of the imbedding of these elements in potting material 65. Mass 30 serves the dual function of activating a signal generating device (crystal 25) to produce a signal having values indicative to the values of accelerations applied to the transducer, and of housing the electronics which condition and amplify the generated signal. Accordingly, the overall size of transducer 10 is less than the size of a transducer of like function wherein the signal conditioning and amplifying electronics are housed in a chamber separate from the mass. The electronic components described above contribute to the mass necessary for the provision of an accelerometer of a given sensitivity. Although the contribution of the weight of the electronic components to the seismic mass is small, this contribution is not negligible. Accordingly, the components must be distributed evenly about the axis of symmetry of the mass. Since the components of the amplifying and signal conditioning circuits contribute to the mass required to deform the signal generating device from its normal condition, transducer 10 is no heavier than (and is often lighter than) a transducer of equal sensitivity in which the electronics are located in a chamber separate from the mass.

The signal produced at the output terminals of transducer 10 is such that it may be transmitted from the transducer to telemetering and/or recording equipment via a multi-conductor shielded cable without being distorted or masked by environmental noise. By dispensing with the requirement that a low capacitance, low noise cable be used between the transducer housing and external signal conditioning electronics, the voltage sensitivity of the transducer need not be recalculated each time a new cable is used with the transducer.

The circuitry shown in FIG. 5 is presented merely for the sake of illustrating the advantages provided by the present invention. Alternate or additional circuit components may be mounted to the seismic mass as desired. For example, the electronic components for the frequency and amplitude damping circuits described in United States Patents 3,349,629 and 3,285,074 may be used.

While the invention has been described above in conjunction with specific apparatus and configurations and geometries thereof, this has been merely by way of example and should not be considered as limiting the scope of this invention.

What is claimed is:

1. A piezoelectric accelerometer comprising a housing defining and enclosed internal chamber, a movement in the chamber for generating a signal indicative of the magnitude of accelerations applied to the housing along a sensitive axis of the transducer, the movement being defined by a plurality of components including a seismic mass, a piezoelectric crystal, and a base arranged along the sensitive axis, and compliant biasing means coupled to the mass for biasing the crystal between the mass and the base under a predetermined load so that accelerations applied along the sensitive axis produce variations in said load thereby to generate said signals, output terminal means carried by the housing and adapted to be coupled to a transducer readout device having an input impedance less than the impedance of the crystal, an impedance converting amplifier module mounted to the mass for movement with the mass relative to the base in response to accelerations applied to the housing, the module being centered along the sensitive axis and including a plurality of electronic circuit elements arranged to define an amplifier circuit coupled between the crystal and the output terminal means for applying signals generated by the crystal to the output terminal means and for presenting to a readout device coupled to the output terminal means an impedance less than that of the crystal, the module having a diameter greater than the diameter of the movement components disposed nextadjacent thereto along the sensitive axis, and conductors extending from the module surfaces which are exposed in directions along the sensitive axis for coupling the amplifier circuit to the crystal and the output terminal means.

References Cited
UNITED STATES PATENTS

| | | | |
|---|---|---|---|
| 3,285,074 | 11/1966 | Elazar | 310—8.4 |
| 3,283,590 | 11/1966 | Shang | 73—517 |
| 3,241,373 | 3/1966 | Ricketts | 73—503 |
| 2,963,911 | 12/1960 | Pratt | 310—8.4 |
| 2,857,462 | 10/1958 | Lin | 179—1 |
| 2,967,924 | 1/1961 | Friend | 310—8.9 |
| 3,045,131 | 7/1962 | Orlacchio | 310—8 |
| 3,130,329 | 4/1964 | Cother | 310—8 |
| 3,294,988 | 12/1966 | Packard | 310—8 |
| 1,919,480 | 7/1933 | Rieben | 310—8 |
| 2,639,210 | 5/1953 | Robertson | 310—8 |
| 3,185,869 | 5/1965 | Shoon | 310—8 |

J. D. MILLER, *Primary Examiner.*